United States Patent [19]

Dietrich et al.

[11] Patent Number: 4,847,029
[45] Date of Patent: Jul. 11, 1989

[54] DEVICE FOR AND METHOD OF CONTINUOUS CASTING MOLTEN MATERIALS

[75] Inventors: Rainer Dietrich, Basel, Switzerland; Norbert Burkardt, Karlsruhe; Peter Kuhn, Weinheim, both of Fed. Rep. of Germany

[73] Assignee: Lonza Ltd., Gampel/Valais, Switzerland

[21] Appl. No.: 165,633

[22] Filed: Mar. 8, 1988

[30] Foreign Application Priority Data

Mar. 11, 1987 [DE] Fed. Rep. of Germany ....... 3707855

[51] Int. Cl.⁴ .............................................. B22D 11/06
[52] U.S. Cl. .................................... 264/175; 164/428; 164/480; 264/DIG. 25; 425/363
[58] Field of Search ................ 164/428, 480; 264/175, 264/DIG. 25; 425/335, 363

[56] References Cited

U.S. PATENT DOCUMENTS 2,603,114  7/1952  Colinet ............................ 164/428 X

FOREIGN PATENT DOCUMENTS 0057651  4/1985  European Pat. Off. .
49-33358  9/1974  Japan ................................. 425/363
57-9566   1/1982  Japan ................................. 164/428
57-94456  6/1982  Japan ................................. 164/480
60-15051  1/1985  Japan ................................. 164/428
60-83754  5/1985  Japan ................................. 164/428
61-53024  3/1986  Japan ................................. 425/363
316568   12/1971  U.S.S.R. ............................ 425/363
517871    2/1940  United Kingdom ................. 164/428

Primary Examiner—Nicholas P. Godici
Assistant Examiner—J. Reed Batten, Jr.
Attorney, Agent, or Firm—Fisher, Christen & Sabol

[57] ABSTRACT

If a liquid metal oxide is fed to the nip of an inwardly cooled pair of rolls to cool and solidify, the rolls are subjected to a great material fatigue because of the constantly changing high heat stresses. A configuration of the rolls with few notches can be achieved by an approximation of the contour of a spherical hood. This is achieved in that each of the rolls (1,2) is designed as a truncated conical section, in that adjacent to the base (9,10), exhibiting the greater diameter of each truncated conical section a cylindrical section (5,6) with the diameter of the base (9,10) and a substantially open front surface (23) is provided. Each truncated conical section is closed, by a plane wall, on the front surface (7,8) with the smaller diameter.

21 Claims, 2 Drawing Sheets

DEVICE FOR AND METHOD OF CONTINUOUS CASTING MOLTEN MATERIALS

BACKGROUND OF THE INVENTION

1. Field of the Invention

The invention relates to a device for the fast cooling and solidifying by the continuous casting of molten materials, especially metal oxides.

2. Prior Art

Devices are known for the fast cooling and solidifying by the continuous casting of molten materials, especially metal oxides.

One of such devices is known from European Patent Document B1 0,057,651. In such device cylindrical rolls with parallel axes are provided, whose nip before the continuous casting is closed by an inserted asbestos piece, and which, together with sealing elements resting on peripheral surfaces of their cylinder shells with sealing in the front, form a pouring space. The nip width to be set for the continuous casting is determined beforehand in each case, and appropriately designed sealing elements are allocated to each nip width. To obtain the core of the formed metal oxide strip still in the molten state during passage through the narrowest point of the nip, the intensity of the inward roll cooling and the rotation speed of the rolls are appropriately adjusted to one another. As a result the exertion of constraining forces on the rolls is to be eliminated, as they would appear if a complete solidication of the metal oxide billet were already present on the narrowest point.

Because of high temperature differences on the shell surface on the rolls due to the inner cooling and the great local heating in the area of contact with the metal oxide, high changing heat stresses occur in the rotating rolls, especially on the transition points from the cylinder outer wall to the hubs, and on the flow passages for the coolant, as a result of which the material is quickly fatigued and fatigue fractures appear.

SUMMARY OF THE INVENTION

The object of the invention is to provide the device of the above-described type wherein the heat stresses in the rotating rolls can be reduced to a minimum with structurally simple means.

This object is achieved based on this type of device according to the invention. The invention device for the fast cooling and solidification by the continuous casting of molten materials, especially metal oxides, has two hollow, inwardly fluid-cooled rolls driven in rotation, between which is provided a nip closed before continuous casting and open during continuous casting, and has sealing elements that cover the front end of the pouring space between rolls and allow the rotation of the rolls. Each of the rolls is designed as a truncated conical section. Adjacent to the base exhibiting the greater diameter of each truncated conical section, a cylindrical section with the diameter of base and a substantially open front surface are provided. Each truncated conical section is closed, by a plane wall, on the front surface with the smaller diameter. The outer shape of each roll approximates the contour of a spherical hood.

By the approximation of the outer contour of each roll to a spherical shell a configuration of the rolls with few notches results, which considerably reduces the material fatigue due to the constantly changing heat stresses. Because the truncated conical section has a greater main radius of curvature than a cylindrical roll with the same diameter, a narrow nip results near the narrowest spot, compared with the cylindrical roll of the same diameter, and thus a better heat elimination in the nip results. A substantially large roll diameter is necessary to obtain such a nip in the case of a cylindrical roll. For the fusion of the solidified material layer already on the roll in the area of the narrowest spot of the nip a greater roll radius of curvature is advisable, so that the material can be held under pressure for a long time. The rolls have such areas in the area of the base of each truncated conical section.

In a preferred embodiment of the invention device shaft, which drives the rolls, extends through substantially the open front surface of cylindrical section up to front surface of the truncated conical section with the smaller diameter and is fastened there (see the hub). With such configuration, the drive shaft can be fastened in a simple way to the roll outside of the area of the great changing heat stresses. Because of the truncated conical shape of the rolls the line of application of the rolling force intersects the roll axis approximately where the rolls reach their greatest diameter, so that in the case of the overhung bearing the bending moment on the neck of the roll becomes very small. Moreover, the structural elements for the bearing and the drive of the roll are protected from the radiant heat of the billet of material. Commercial continuously adjustable motor-transmission units can be used for driving the rolls.

In another preferred embodiment of the invention device, the axis of the rolls are in a plane and the axes of the rolls are parallel to one another. In such arrangement of the rolls, the truncated conical sections of the rolls in their front areas have different peripheral speeds, which means a forced slip in these areas of the metal oxide going through the nip, as a result of which a torsion action is exerted on the metal oxide. Such torsion action in the solidified material results in the formation of narrow and uniform cracks, which promotes the subsequent crushing.

In another preferred embodiment of the invention device, each sealing element, independently of the nip width, in each case is in sealing contact with the cylindrical section of one roll and can be moved into sealing contact along the smaller front surface of the truncated conical section of the other roll. With such configuration of the sealing elements, a simple front sealing can be maintained independently of the nip. For changing the nip either only one roll or both rolls are moved in the axial direction.

In another preferred embodiment of the invention device, the axes of the rolls are in a plane, wherein axes of rolls intersect one another. With such configuration, the areas of the tapered conical sections facing one another have the same peripheral speed, which increases from the front surface with smaller diameter to the base of the truncated conical section.

In another preferred embodiment of the invention device, the sealing elements are angle plates, one of which, independently of the nip width, can be moved into sealing contact along the smaller front surfaces of the truncated conical sections of the two rolls and the other plate remains in sealing contact with cylindrical section of the two rolls. With such configuration of the sealing elements, the front sealing can be maintained independently of the nip position, if one of the rolls is moved for nip readjustment in the direction of its axis or both rolls are moved perpendicular to the nip.

In another preferred embodiment of the invention device, the plane in which the axes of the rolls are located, is inclined to the horizontal plane at such an angle that the angle of contact of the melt with surfaces of the rolls is equal everywhere. With such measure, a uniform cooling time over the entire width of the billet of material can be achieved in the case of the rolls with intersecting axis, since in the area of the greater peripheral speed of the truncated conical sections the level of the liquid metal oxide pouring has a greater height over the nip than in the area with the smaller peripheral speed, which extends to the front surface with the smaller diameter of the truncated conical sections.

In another preferred embodiment of the invention device, the truncated conical sections of the two rolls have equal angles of opening, which are between 60° and 120°. Quite preferably the angle of opening of the truncated conical sections of the two rolls is 90°. Or, in other words, the approximation of the contour of a spherical hood is especially favorable with the angles of opening being between 60° and 120°, optimal with the angle of opening being 90°.

A further preferred embodiment of the invention device, the sealing elements composed of graphite exhibiting pore ducts, which are connected by connecting ducts to a pressure source for protective gas that expels the oxygen of the air. With such measure, a burning of the sealing elements at the prevailing high temperatures is prevented.

The device according to the invention is especially suitable for processing ceramic melts from aluminum oxide in mixture with baddeleyite and/or the oxides of zirconium, magnesium, yttrium, calcium and chromium in the form of single or multiple component systems, especially for materials for grinding purposes, as plasma injection powder and as sinter powder for molded articles.

BRIEF DESCRIPTION OF THE DRAWINGS

Embodiments of the invention are explained in greater detail by means of the drawings. In the drawings.

DETAILED DESCRIPTION OF THE INVENTION

Figure 1:
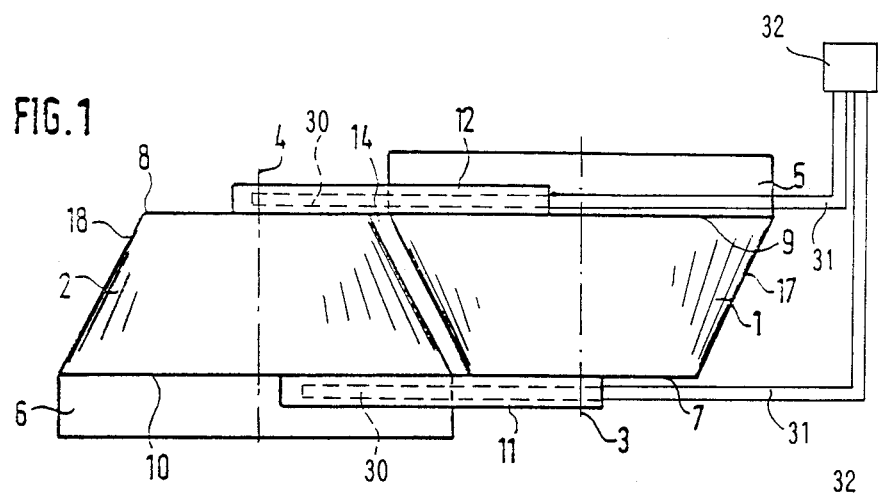
FIG. 1 is a top view of the device with rolls with parallel axes.
Figure 2:
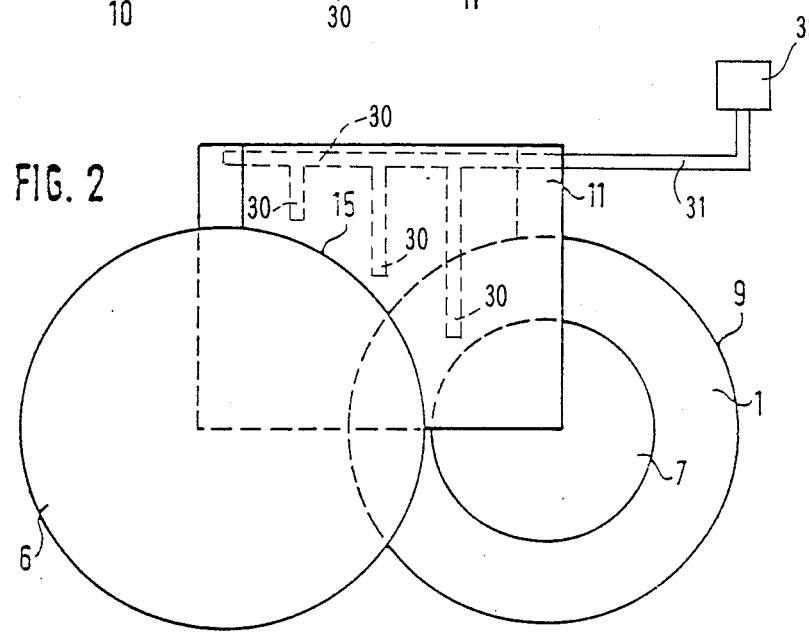
FIG. 2 is a front view of the device of FIG. 1.

The device shown in FIGS. 1 and 2 is composed of two rolls 1 and 2 in the form of truncated conical sections, each of which exhibits a base 9 or 10 with greater diameter and a front surface 7 or 8 with smaller diameter. Rolls 1 and 2 are arranged so that base 9 of one roll 1 is in one plane with the small front surface 8 of the other roll 2, while the one front surface 7 of one roll 1 and base 10 of the other roll 2 are also in a plane that is parallel to the first mentioned plane. With this arrangement, axis 3 of one roll 1 is parallel to axis 4 of the other roll 2. Axes 3 and 4 are perpendicular to such planes, since the truncated cones with surfaces 17 and 18 are straight truncated cones.

To base 9 of a roll 1 is connected a cylindrical section 5, whose diameter corresponds to that of base 9. Similarly, to base 10 of the other roll 2 is connected a cylindrical section 6, whose diameter corresponds to that of base 10. Between their surfaces 17 and 18, rolls 1 and 2 form a nip 14, which by moving one or both rolls 1,2 perpendicular to their axes 3,4 can be adjusted from the contact position, i.e., from zero value, to a desired size.

The pouring space between rolls 1 and 2 over nip 14 is closed in the front by sealing elements 11 and 12. As can be seen in FIG. 2, sealing element 11 rests in front on front surface 7 of a roll 1 and seals the peripheral surface of cylindrical section 6 with a correspondingly curved sealing surface 15, which allows the rotation of roll 2. In adjusting nip 14 only one roll 1 with its front surface 7 is moved relative to sealing element 11, which stays in contact with it. Sealing element 12 is designed in the same way, and during adjustment of nip 14, sealing element 12 moves in the front along smaller front surface 8 of roll 2 and remains in sealing contact with cylindrical section 5 of roll 1.

Figure 3:
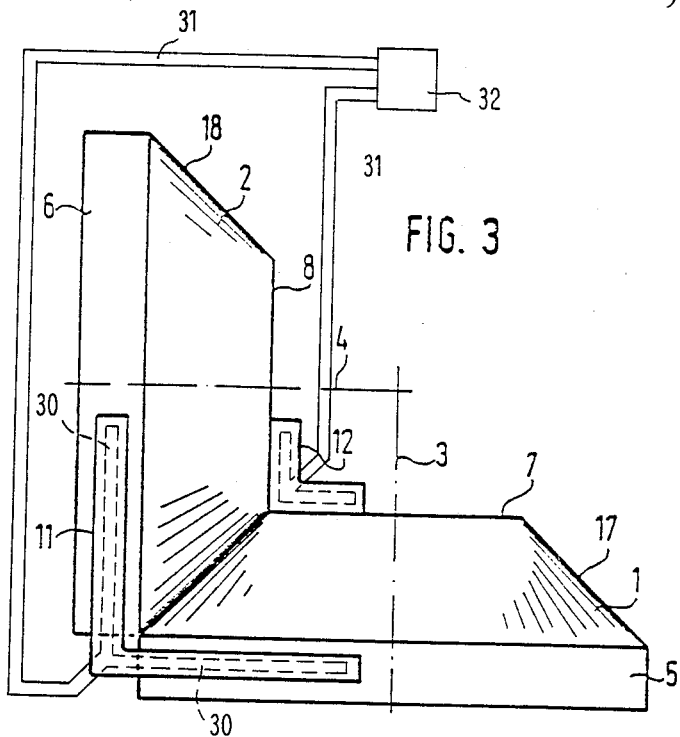
FIG. 3 is a top view of the device with rolls with intersecting axes.

In the embodiment of the device shown in FIG. 3, rolls 1 and 2 have an opening angle of 90° so that their axes 3 and 4 intersect at an angle of 90°. Sealing elements 11 and 12 are rectangularly bent angle plates, which are in sealing contact with the peripheral surfaces of cylindrical sections 5 and 6 or front surfaces 7 and 8 and allow the rotation of rolls 1 and 2. As a result, the pouring space of nip 14 is adequately sealed in the front.

If in the roll arrangement of FIG. 3 the metal oxide melt is to have a constant angle of contact with surfaces 17 and 18 of the truncated conical sections of rolls 1 and 2, axes 3 and 4 of rolls 1 and 2 must be inclined so that in the area of smaller front surfaces 7 and 8 they are higher than in the area of their cylindrical sections 5 and 6.

Figure 4:
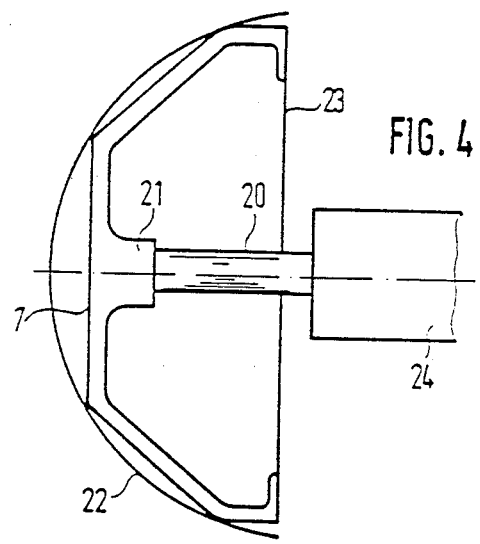
FIG. 4 is an axial section of a roll of the device of FIG. 1 or 3.

In roll 1 shown in FIG. 4 the truncated conical section has an opening angle of 90°.Front surface 7 with the smaller diameter is provided with a wall with a central hub 21 on the inside, in which drive shaft 20 is held resistant to torsion, as a result of which roll 1 is overhung. Front surfaces 23 of cylindrical section 5, opposite front surface 7, is substantially open. In this area, drive shaft 20 is coupled to a drive unit 24, which is protected from radiant heat by roll 1. Roll 1 is cooled on the inside in the area of front surface 7 by a tangential component of evaporated water which is kept in contact with the inner wall of roll 1 by centrifugal force and is guided along this wall for a reversal on front surface 23 of cylindrical section 5 and there is removed laterally.

Sealing elements 11 and 12 are connected by boreholes (connecting pores) 30 and connections 31 to a pressure source 32, from which a protective gas such as nitrogen or argon is introduced in sealing elements 11 and 12 made of graphite and any oxygen in the air is expelled from sealing elements 11 and 12 in their wall areas so that a combustion of the graphite at the high temperatures present is not possible.

The optimal approximation of the configuration of roll 1 in FIG. 4 to a spherical hood is illustrated by contour 22.

What is claimed is:

1. Device for the fast cooling and solidification by continuously casting of molten material, having two hollow, inwardly fluid-cooled rolls (1,2) driven in rotation, between which is provided a nip (14) closed before continuous casting and open during continuous casting and having sealing elements (11,12) that cover the front end of the pouring space between the rolls (1,2) and allow the rotation of the rolls, characterized in that each of the rolls (1,2) has a truncated conical section, that the rolls (1, 2) each have a forming surface (17, 18) that are adjacent to each other, that the adjacent surfaces (17, 18) provide the entire forming profile of the rolls (1, 2) and are in close proximity to each other when the molten material is cast, that adjacent to the base (9,10) exhibiting the greater diameter of each truncated conical section, a cylindrical section (5,6) with the diameter of the base (9,10) and a substantially open front surface (23) is provided, that each truncated conical section is closed, by a plane wall, on the front surface (7,8) with the smaller diameter, and that the outer shape of each roll (1,2) approximates the contour of a spherical hood.

2. Device according to claim 1 wherein a shaft (20) which drives the rolls (1,2), extends through substantially the open front surface (23) of the cylindrical section (5,6) up to the front surface (7,8) of the truncated conical section with the small diameter and is fastened there on a hub 21 which is located behind the front surface (7,8).

3. Device according to claim 2 wherein the axes (3,4) of the rolls (1,2) are in a plane and wherein the axes (3,4) of the rolls (1,2) are parallel to one another.

4. Device according to claim 3 wherein each sealing element (11,12), independently of the nip width, in each case is in sealing contact with the cylindrical section (6,5) of one roll (2,1) and can be moved into sealing contact along the smaller front surface (7,8) of the truncated conical section of the other roll (1,2).

5. Device according to claim 4 wherein the sealing elements (11,12) consist of graphite exhibiting pore ducts which are connected by connecting ducts (30) to a pressure source (32) via pressure lines (31) for protective gas that expels the oxygen of the air.

6. Device according to claim 2 in which the axes (3,4) of the rolls (1,2) are in a plane, wherein the axes (3,4) of the rolls (1,2) intersect one another.

7. Device according to claim 6 wherein the sealing elements (11,12) are angle plates, one of which, independently of the nip width, can be moved into sealing contact along the smaller front surfaces (7,8) of the truncated conical sections of the two rolls (1,2) and the other plate remains in sealing contact with the cylindrical section (5,6) of the two rolls (1,2).

8. Device according to claim 7 wherein the sealing elements (11,12) consist of graphite exhibiting pore ducts which are connected by connecting ducts (30) to a pressure source (32) via pressure lines (31) for protective gas that expels the oxygen of the air.

9. Device according to claim 7 wherein the plane in which the axes (3,4) of the rolls (1,2) are located, is inclined to the horizontal plane at such an angle that the angle of contact of the melt with the surfaces (17,18) of the rolls (1,2) is equal everywhere.

10. Device according to claim 9 wherein the truncated conical sections of the two rolls (1,2) have equal angles of opening, which are between 60° and 120°.

11. Device according to claim 10 wherein the angle of opening of the truncated conical sections of the two rolls (1,2) is 90°.

12. Device according to claim 6 wherein the plane in which the axes (3,4) of the rolls (1,2) are located, is inclined to the horizontal plane at such an angle that the angle of contact of the melt with the surfaces (17,18) of the rolls (1,2) is equal everywhere.

13. Device according to claim 12 wherein the truncated conical sections of the two rolls (1,2) have equal angles of opening, which are between 60° and 120°.

14. Device according to claim 13 wherein the angle of opening of the truncated conical sections of the two rolls (1,2) is 90°.

15. Device according to claim 1 wherein the axes (3,4) of the rolls (1,2) are in a plane and wherein the axes (3,4) of the rolls (1,2) are parallel to one another.

16. Device according to claim 1 wherein each sealing element (11,12), independently of the nip width, in each case is in sealing contact with the cylindrical section (6,5) of one roll (2,1) and can be moved into sealing contact along the smaller front surface (7,8) of the truncated conical section of the other roll (1,2).

17. Device according to claim 1 wherein the axes (3,4) of the rolls (1,2) are in a plane and wherein the axes (3,4) of the rolls (1,2) intersect one another.

18. Device according to claim 1 wherein the truncated conical sections of the two rolls (1,2) have equal angles of opening, which are between 60° and 120°.

19. Device according to claim 1 wherein the molten material is metal oxides.

20. Process comprising continuously casting a molten material to effect the fast cooling and solidification of molten material using the device of claim 1.

21. The process as claimed in claim 20 wherein the molten material is at least one molten oxide.

* * * * *